Figure 1:
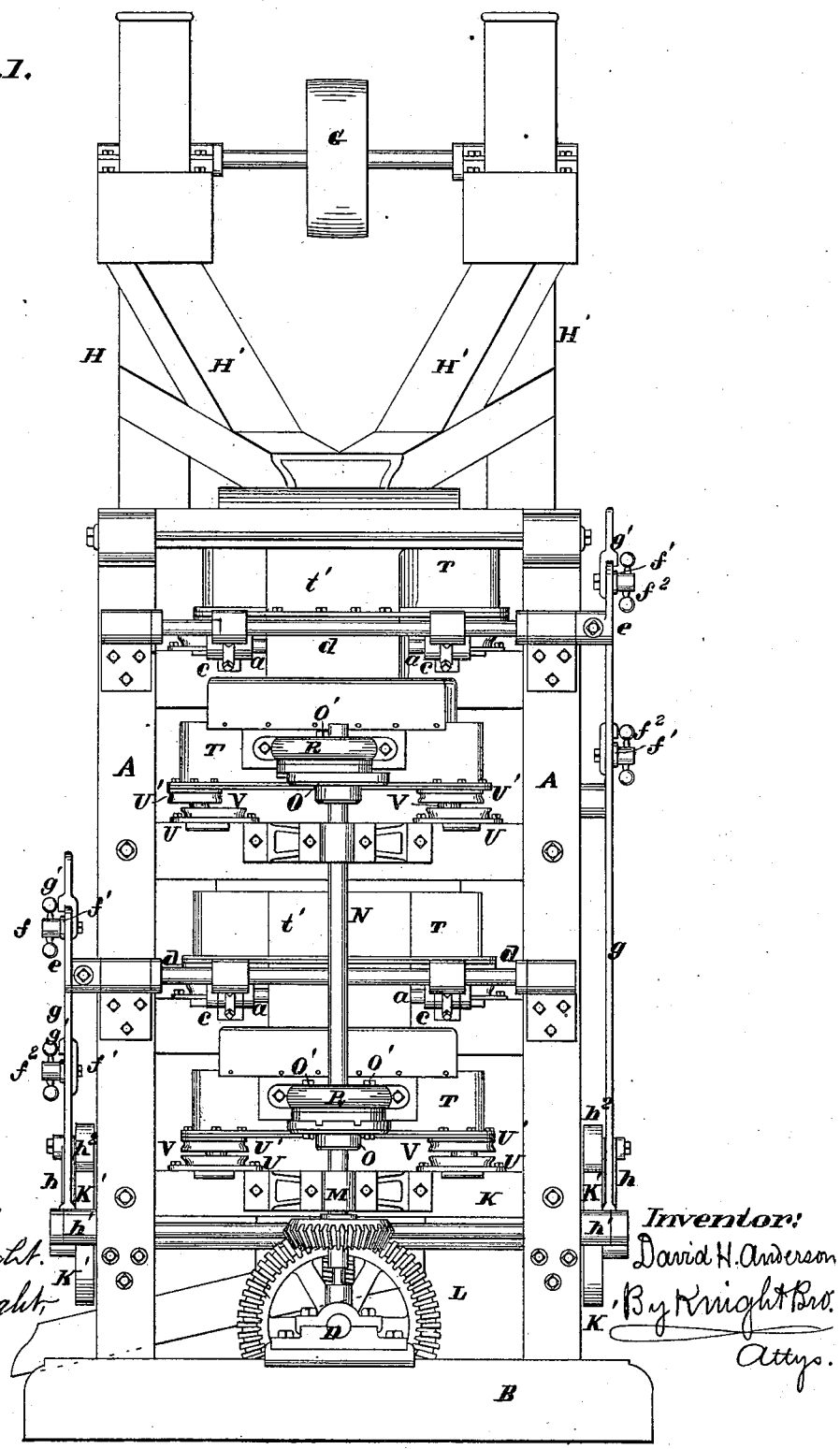

(No Model.) 5 Sheets—Sheet 1.

D. H. ANDERSON.
MACHINE FOR CONCENTRATING AND AMALGAMATING ORES.

No. 272,614. Patented Feb. 20, 1883.

Attest:
Geo. H. Knight.
J. G. Knight.

Inventor:
David H. Anderson
By Knight Bro.
Attys.

(No Model.) 5 Sheets—Sheet 3.
D. H. ANDERSON.
MACHINE FOR CONCENTRATING AND AMALGAMATING ORES.
No. 272,614. Patented Feb. 20, 1883.

Attest:
Geo. H. Knight.
J. E. Knight

Inventor:
David H. Anderson
By Knight Bros.
Attys.

(No Model.) 5 Sheets—Sheet 4.

D. H. ANDERSON.
MACHINE FOR CONCENTRATING AND AMALGAMATING ORES.

No. 272,614. Patented Feb. 20, 1883.

Attest:
Geo. H. Knight.
J. G. Knight.

Inventor:
David H. Anderson
By Knight Bros
Attys.

(No Model.) 5 Sheets—Sheet 5.
D. H. ANDERSON.
MACHINE FOR CONCENTRATING AND AMALGAMATING ORES.
No. 272,614. Patented Feb. 20, 1883.
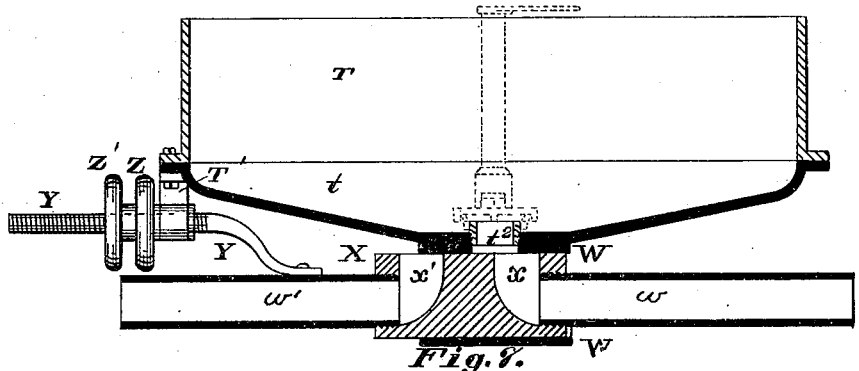
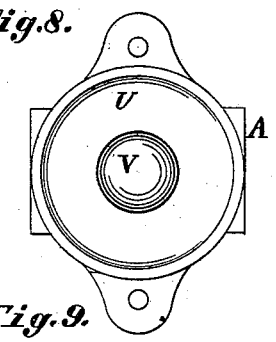
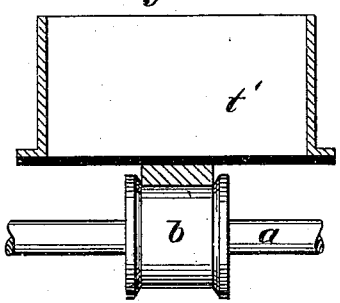
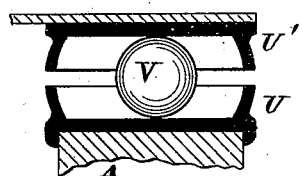
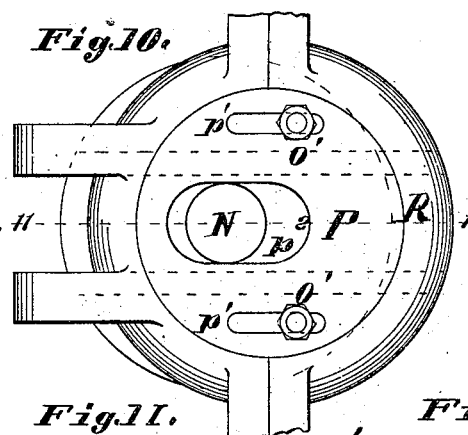
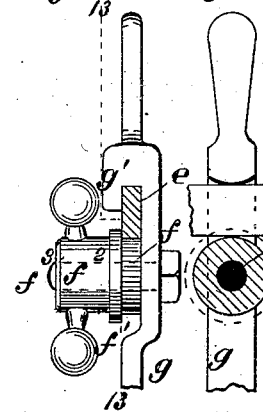
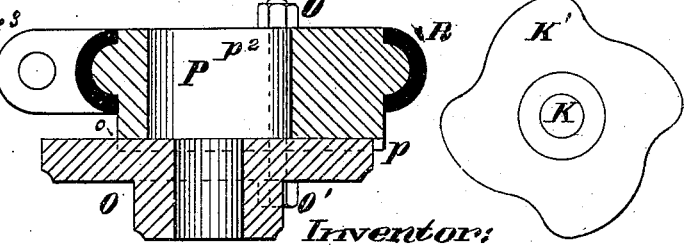
Attest:
Geo. H. Knight.
J. G. Knight
Inventor:
David H. Anderson
By Knight Bros
Attys.

UNITED STATES PATENT OFFICE.

DAVID H. ANDERSON, OF BUTTE CITY, MONTANA TERRITORY.

MACHINE FOR CONCENTRATING AND AMALGAMATING ORES.

SPECIFICATION forming part of Letters Patent No. 272,614, dated February 20, 1883.

Application filed May 1, 1882. (No model.)

*To all whom it may concern:*

Be it known that I, DAVID H. ANDERSON, of Butte City, Silver Bow county, Territory of Montana, have invented a certain new and useful Improvement in Machines for Concentrating and Amalgamating Ores, of which the following is a specification, reference being had to the accompanying drawings, forming part of the same.

My invention relates to a machine to be used as a concentrator and amalgamator in connection with stamping-mills, also for the gold-bearing sands on the ocean-beaches and other placer-mining, and for working over tailings from mills. By the use of this machine floured quicksilver may be saved, and also amalgam from silver ores, also the heavier débris or pyrites, irons, galenas, carbonates, sulphurets, &c., containing metals. The pans of this machine have all the movements of a gold-pan in the hands of a placer-miner. It is known that if the operation of a machine could be made as perfect as that of a miner with his pan, profit could be made by the working over of nearly all mill-tailings that cannot be worked over by the machines heretofore in use without pecuniary loss; and as the principles of movement of my machine conform to those of the pan in the hands of a miner, it is claimed that the machine is available for the working over of such tailings with profit. The gold-placers of the ocean-beaches many of them contain gold in paying quantities when saved by the ordinary pan of the miner; but the particles of metal are so fine and light that they are carried over with the water that is used in large quantity by the machines heretofore in use. In my machine only a moderate quantity of water is required, and a variable compound circular and dipping motion is imparted to the pan, keeping the whole contents agitated and encouraging the settling of the heavier portions and the escape of the lighter parts. The pans are arranged with a two-way slide-valve at bottom, by which the discharge of the heavier portions is regulated in amount and destination, or by which such discharge may be stopped. The eccentrics, which give the revolutionary or circular movements to the pans, are made adjustable in eccentricity to regulate the amount of the movement. The discharging ends or spouts of the pans have vertical reciprocation to assist the discharge through the spout and to agitate the contents of the pan. This movement is made to vary according to circumstances. When used as a concentrator the tailings from each pan is discharged into the receiving end of the pan next below, and the tailings from the lower pan is ordinarily allowed to run to waste, though it may be worked over by another machine, if desired. If the concentrates from the lower pan is not rich enough to save, it may be run into the elevator and worked over in the same machine or another.

Figure 2:
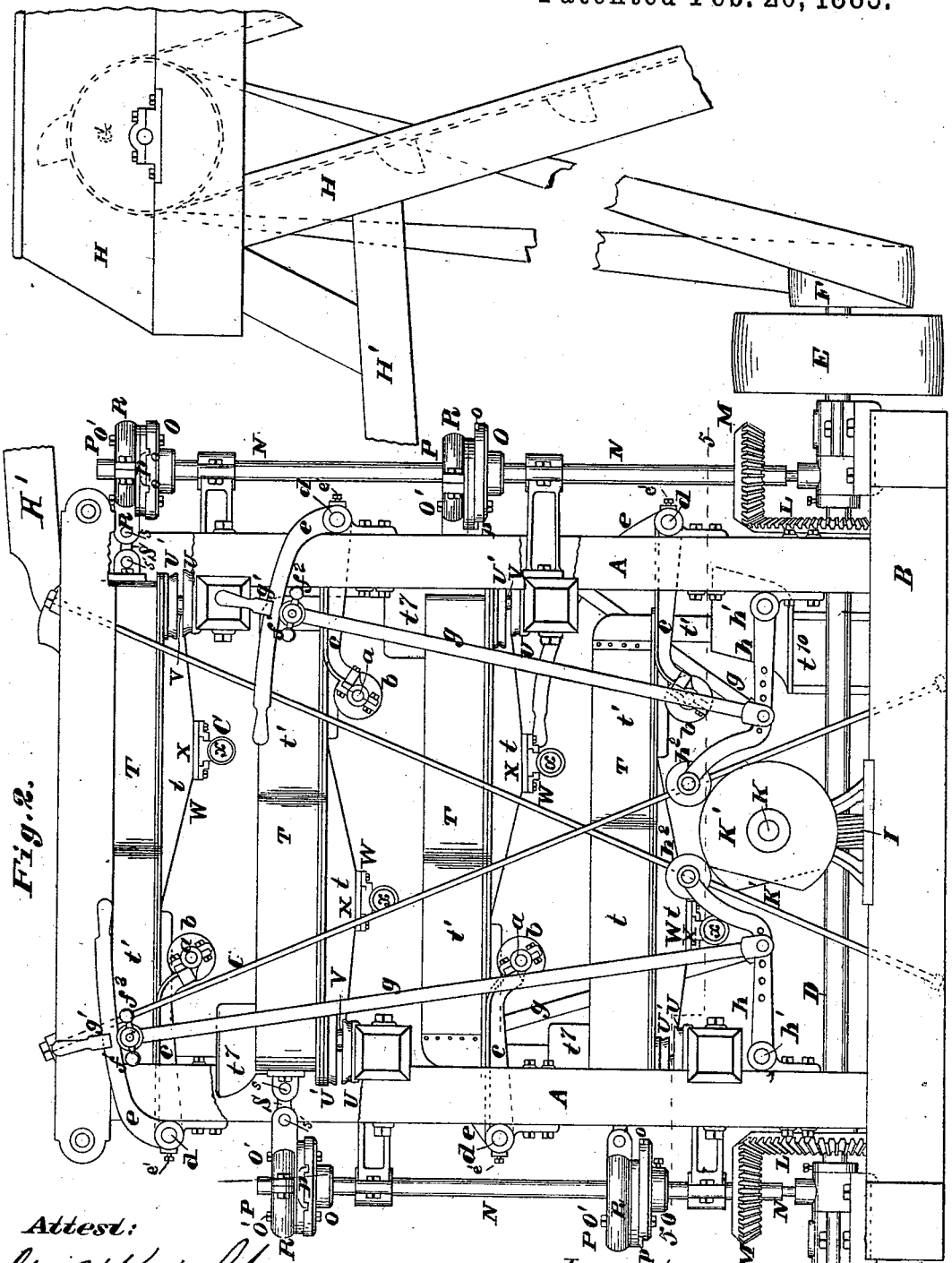
Figure 3:
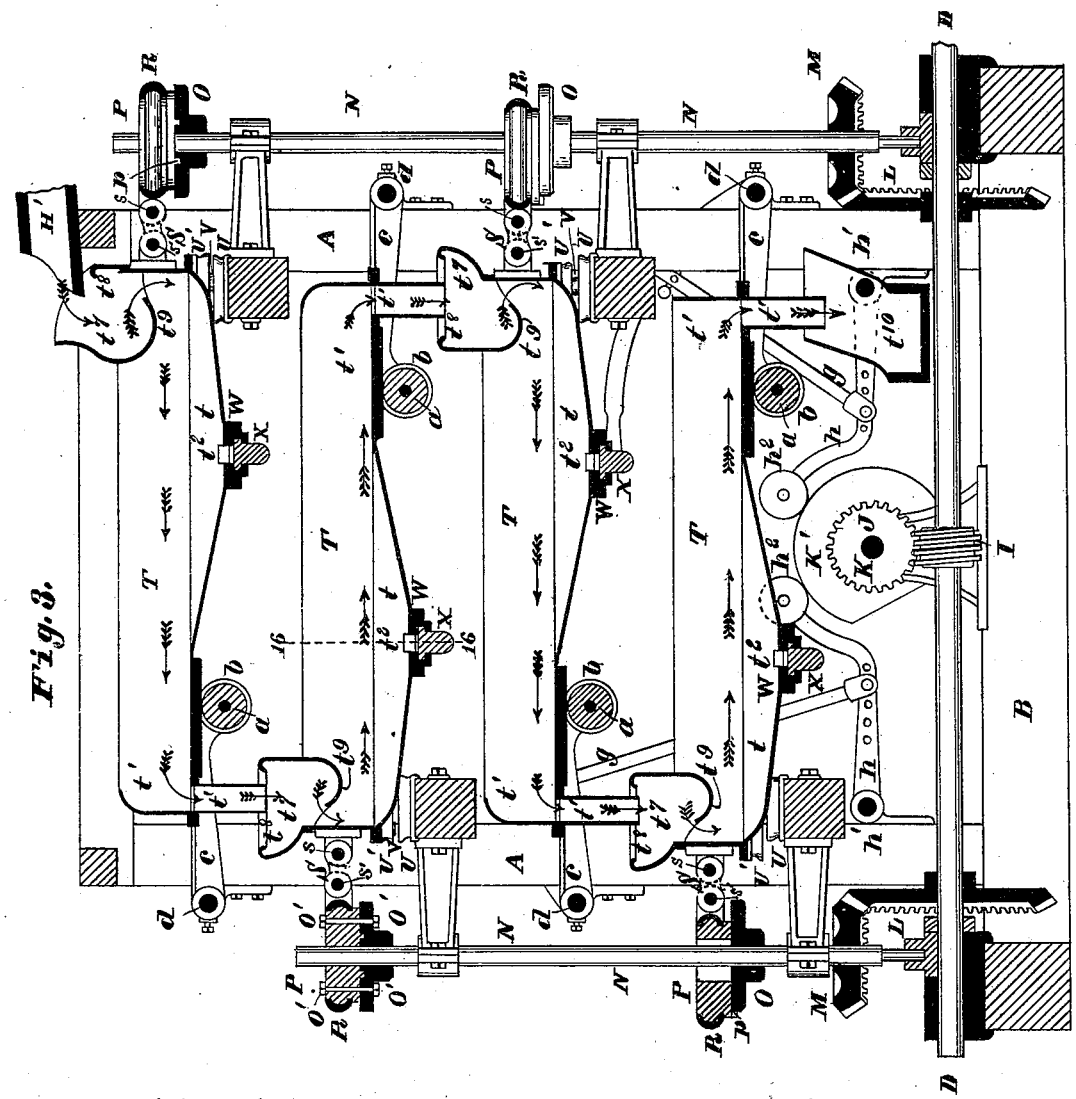
Figure 4:
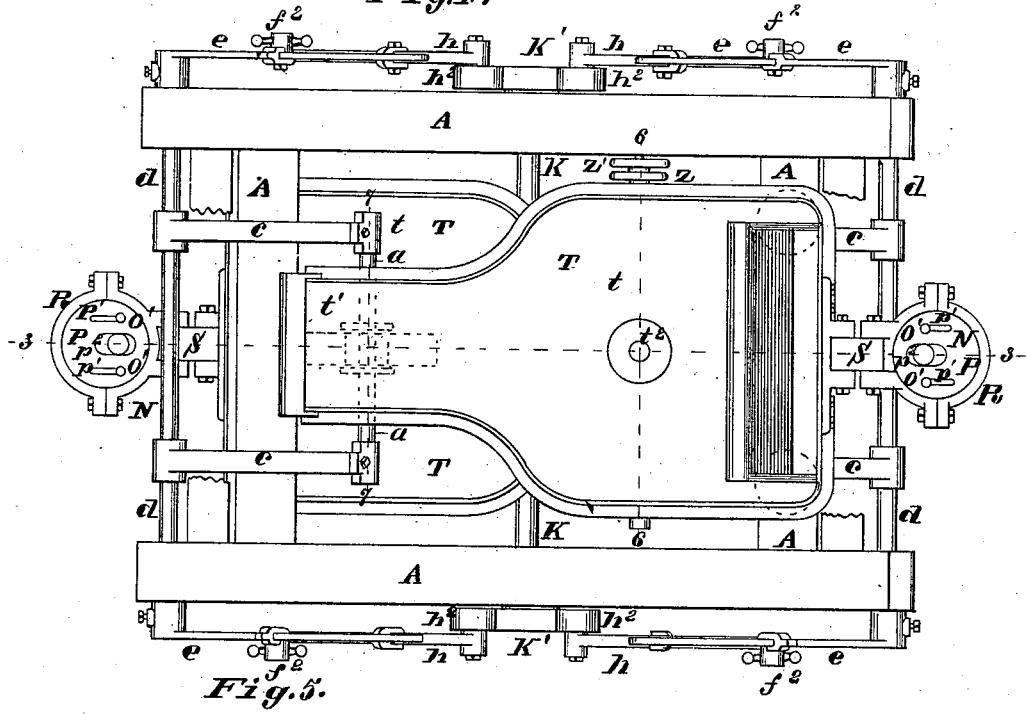
Figure 5:
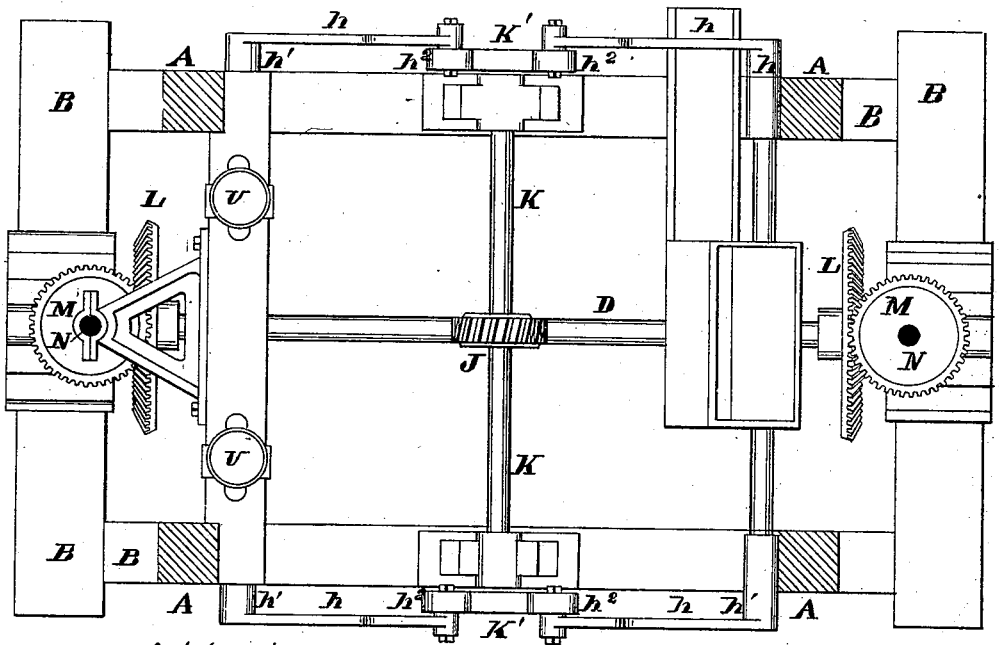

In the drawings, Figure 1 is an end view of the machine. Fig. 2 is a side view of the machine. Fig. 3 is a longitudinal section at 3 3, Fig. 4. Fig. 4 is a top view. Fig. 5 is a jogged horizontal section at 5 5, Fig. 2. Fig. 6 is an enlarged transverse vertical section of one of the pans at 6 6, Fig. 4. Fig. 7 is an enlarged transverse vertical section of one of the pans at 7 7, Fig. 4. Fig. 8 is a detail view of one of the ball-bearing saucers and bearing-ball, enlarged. Fig. 9 is an enlarged vertical section through one of the ball-bearings. Fig. 10 is an enlarged top view of one of the eccentrics. Fig. 11 is a vertical section of the eccentric at 11 11, Fig. 10. Fig. 12 is a detail showing the connection between a connecting-rod and a rock-shaft arm by which vertical reciprocation is imparted to the discharging end of the pan. Fig. 13 is a section at 13 13, Fig. 12. Fig. 14 is a detail showing a substitute for the ball-bearing of the pan. Fig. 15 is a side view of a modified form of cam-wheel actuating the pan in its vertical oscillation. Fig. 16 is an enlarged vertical section at 16 16, Fig. 3, showing in addition a hood or cap used when washing coarse material.

The machine has a rectangular or other suitable supporting-frame, A, with a bed, B.

C are stay-rods.

D is the main or drive shaft, carrying a drive pulley, E.

F is a pulley on the shaft D, on which is a belt extending to the pulley G of the elevator-shaft.

The elevator H may be of any suitable construction. No novelty is claimed in the elevator. The elevator discharges the pulverized ore or slime, tailings or gold-bearing sand, or other material to be concentrated or amalgamated into the upper one of the pans through a spout, H'. In cases when required a riddle or sieve may be interposed between the spout H' of the elevator and the pan, to prevent the passage of any coarse material.

Upon the main shaft D is a gear-screw, I, that engages a gear-screw wheel, J, upon a cam-shaft, K, running transversely to the shaft D. The main shaft D carries bevel cog-wheels L, that engage bevel-wheels M upon vertical eccentric-shafts N, one of said shafts N being at each end of the machine. Each vertical shaft carries eccentric-hubs O, upon which are adjustable eccentrics P. The eccentrics are secured to the hubs by set-screws O', screwing in the hubs and passing through slots $p'$ in the eccentrics. At $p$ are tongues on the under side of the eccentric, which work in grooves $o$ of the hubs, said tongues and grooves being parallel with the slots $p'$. The hubs O are made fast to the shafts N, and each shaft passes through a slot, $p^2$, in each eccentric, to allow the diametric movement of the eccentrics on the hubs.

R is the yoke of the eccentric, hinged horizontally, by a broad coupling-link, S, and pins $s\ s'$, to the broader end of the concentrating and amalgamating pan T. The link S has sufficient breadth to brace the connection against transverse strain, rendering it incapable of horizontal flexure and causing it to bend in a vertical direction, so that the part of the pan to which the link is attached will be carried around in a horizontal circle, such movement being freely permitted by the manner of supporting this end of the pan. This may be by links, (see Fig. 14;) but I prefer ball-bearings, as shown in the other figures. The ball-bearings consist each of an upright saucer, U, attached to the frame A, and an inverted saucer, U', attached to the pin, with a ball, V, between them, formed of hard wood or other suitable material. The main part of the pan is made broader than the spout, and has a hopper-formed bottom, $t$, descending below the level of the spout $t'$. At the lower part or center of the hopper is a nipple, $t^2$, whose edge is preferably raised above the bottom of the hopper. (See Fig. 6.) This nipple forms a passage or duct for the escape of the heavier portions (or concentrates) from the pan.

Beneath the nipple $t^2$ is a valve chamber, W, in which works a valve, X, seated against the under side of the hopper. The valve X has two ports, $x\ x'$, either of which may be brought in connection with the orifice or nipple $t^2$ to receive the material. The ports $x$ and $x'$ extend to the opposite ends of the valve, where are nipples for connection of hose-pipes $w\ w'$, by which the material is conducted to any desired place. Thus it will be seen that the concentrates can be led to either side of the pan; or the discharge may be stopped by closing the valve X. The valve X is adjusted and held in position by a screw, Y, which passes through a hand-nut, Z, turning in a bracket, T', at the under side of the pan.

Z' is a jam-nut, turning on the screw Y, to fix the hand-nut in position.

The spout $t'$ of each pan T rests on a friction-roller, $b$, supported on arms $c$ by a rod, $a$. The arms $c$ extend from a rock-shaft, $d$. Each rock-shaft has an arm, $e$, secured in position upon it by a set-screw, $e'$, or otherwise. The arm $e$ bears upon a connecting-rod, $g$, by means of a roller, $f$. (See Figs. 12 and 13.) The lower end of the connecting-rod bears upon a lever, $h$, fulcrumed at $h'$ to the frame A, and carrying at the free end a friction-roller, $h^2$, bearing upon the upper side of the cam K' upon the cam-shaft K.

The machine shown in the drawings has four concentrating-pans, T. The connecting-rods $g$ operating the pans are two upon each side of the machine, each pair of rods $g$ and levers $h$ being worked by a single cam, K'; but it is obvious that each of the levers may have its proper cam. The connecting-rod may have capacity for adjustment upon both the lever $h$ and the arm $e$, so as to vary the amount of vertical movement given to the spout end of the pan; or the connecting-rod may have adjustable connection at one end only. I show pin-holes for adjustment endwise upon the lever $h$. The arms $e$ are curved, substantially as shown, so that the movement of the connecting-rod along the lever will not change the mean height of the arm and spout of the pan. The connecting-rod has a lip, $g'$, engaging over the arm $e$. The roller $f$ is made with a flange, $f'$, that is made to bear against the side of the arm by a hand-nut, $f^2$, on the arbor $f^3$ of the roller $f$, so as to prevent the endwise movement of the connecting-rod along the arm. When the nut is turned outward the roller $f$ is free to roll on its arbor $f^3$ to allow the easy adjustment of the rod along the arm $e$.

The connecting device between the arm $e$ and connecting-rod $g$ may be varied from that described, the essential feature being that the connection shall allow the adjustment of the rod upon the arm $e$.

The peripheries of the cams K' may be varied according to circumstances. The cam may be made to give a single upward and downward movement to the pan for each rotation of the cam, (see Figs. 2 and 3,) or to give more frequent movement to the pans. (See Fig. 15.) The periphery may be made to give a more rapid movement in descent of the pan than in its ascent, or vice versa. The cams may be arranged on the shaft K to cause the descent of the spout end of the pan at the same time that the eccentric is causing the retraction of the pan, or vice versa. Thus by the described construction of the driving parts and their adjustment a compound circular and dipping movement is given to the pans that may be adjusted according to circumstances.

The valve X of one or more of the pans may be closed to enable the use of the same for purposes of amalgamation.

In Fig. 16 and in dotted lines in Fig. 6 I show a modification used in treating coarse or granulated ore. In this the nipple $t^2$ is made with an outside screw-thread, on which screws a collar, $t^3$, having radial arms $t^4$, supporting a cap or hood, $t^5$, with an angular boss, $t^6$, upon its top. This device acts as a regulating trap or valve and allows the valve X to be set wide open, so that the discharge of concentrates may be regulated at will by the position of the cap $t^5$, and there will be no danger of the material lodging in the valve X. The cap is turned by a wrench fitting the boss $t^6$, said wrench extending above the material in the pan and being fixed to the boss or removable therefrom. It will be understood that the material (when the cap $t^5$ is used) passes beneath the edge of the cap, and then between the arms $t^4$ and down through the nipple $t^2$.

When the machine is used as a concentrator the material, in passing through the machine, follows the course indicated by the arrows in Fig. 3. It runs from the elevator-spout H' into the receiving-hopper $t^7$ of the upper pan. The receiving-hopper $t^7$ has at its upper edge a downcurved inside flange, $t^8$, to prevent the material being splashed out of the hopper by the movements of the pan T.

$t^9$ is a shield at the bottom of the receiving-hopper to prevent the contents of the pan T being splashed up into it.

The downturned ends of the spouts $t'$ are made removable, so that spouts may be substituted in their place, carrying the material to either side of the machine when it is desired to use either of the pans separately. The lower pan discharges the tailings into a tailing-spout, $t^{10}$.

The upper two pans, T, and the receiving-hoppers $t^7$ in connection therewith, I prefer to line or coat with zinc to change the floured mercury that may exist in the tailings being worked into liquid, in which condition it may be saved.

I claim as my invention—

1. In combination with a concentrating or amalgamating pan, the means of producing a circular motion at one end or side of the same and a vertical or dipping motion on its opposite end or side, for the purpose set forth.

2. The combination, with a concentrating or amalgamating pan and an actuating-eccentric on a vertical shaft, of hinges bending in a vertical direction and incapable of horizontal flexure.

3. The combination, with a concentrating or amalgamating pan, of an actuating-eccentric, P, the vertical shaft N, the coupling-link S, lugs, pins $s\ s'$, and ball-bearings V, upon which said pan rests, for the purpose set forth.

4. The combination, with the concentrating-pan, of a coupling-link constructed substantially as described, an adjustable actuating-eccentric, and a vertical shaft, for the purpose set forth.

5. The combination, with the concentrating-pan T, of a roller-bearing, $b$, supporting-arms therefor, a rock-shaft, $d$, having an arm, $e$, a cam, K', and suitable connections between the latter arm and the cam, for the purpose set forth.

6. The combination, with a concentrating or amalgamating pan, roller-bearing, and supporting-arms therefor, of a rock-shaft having an actuating-arm, $e$, adjustable thereon, for the purpose set forth.

7. The combination, with a concentrating-pan having a single escape-aperture, of an adjustable two-way slide-valve, X, for the purpose set forth.

8. The combination, with a concentrating or amalgamating pan having nipple $t^2$, of a two-way slide-valve, X, having ports $x\ x'$, and the adjustable cap or valve $t^5$, as and for the purpose set forth.

9. The combination, in an ore-concentrator or amalgamating-machine, of cam K', lever $h$, link $g$, adjustably connected to the arm $e$, the arm $e$, curved as set forth, rock-shaft $d$, bearing arms $c$, and pan T, substantially as set forth.

10. The pan T, formed with a broader and deeper part, $t'$, and a contracted discharge-spout, $t'$, in combination with the means of producing a circular and dipping motion, substantially as set forth.

11. The combination, with a concentrating-pan, of the receiving-hopper $t^7$, provided with the discharge-aperture adjacent to the end of pan T, and curved bottom or shield $t^9$, projecting into the pan, substantially as and for the purpose set forth.

DAVID H. ANDERSON.

Witnesses:
SAML. KNIGHT,
GEO. H. KNIGHT.